United States Patent [19]

Simpson et al.

[11] 4,446,248

[45] May 1, 1984

[54] HYDROTREATING CATALYST

[75] Inventors: Howard D. Simpson, Irvine; Ryden L. Richardson, Whittier; both of Calif.

[73] Assignee: Union Oil Company of California, Los Angeles, Calif.

[21] Appl. No.: 408,264

[22] Filed: Aug. 16, 1982

[51] Int. Cl.$^3$ .............................................. B01J 27/14
[52] U.S. Cl. .................................................. 502/211
[58] Field of Search ................................ 252/435, 437

[56] References Cited

U.S. PATENT DOCUMENTS

| | | | |
|---|---|---|---|
| 2,813,837 | 11/1957 | Holden | 252/465 |
| 3,287,280 | 11/1966 | Colgon et al. | 252/435 |
| 3,627,672 | 12/1971 | Kittrell | 252/437 X |
| 3,645,914 | 2/1972 | Rosinski et al. | 252/455 |
| 3,684,695 | 8/1972 | Neel et al. | 252/435 X |
| 3,755,148 | 8/1973 | Mickelson | 252/437 X |
| 3,755,196 | 8/1973 | Mickelson | 252/437 X |
| 3,897,365 | 7/1975 | Feins et al. | 252/437 X |
| 4,028,227 | 6/1977 | Gustafson | 208/216 |
| 4,255,282 | 3/1981 | Simpson | 252/437 X |
| 4,317,746 | 3/1982 | Richardson | 252/435 |

FOREIGN PATENT DOCUMENTS 1024317  3/1966  United Kingdom ................ 252/435

*Primary Examiner*—William G. Wright
*Attorney, Agent, or Firm*—Denton L. Anderson; Gregory F. Wirzbicki; Dean Sandford

[57] ABSTRACT

A hydrotreating catalyst comprising molybdenum, nickel, and phosphorus active components supported on gamma alumina is prepared with gamma alumina support particles which have been contacted with aqueous ammonia.

24 Claims, No Drawings

HYDROTREATING CATALYST

BACKGROUND OF THE INVENTION

This invention relates to hydrocarbon conversion catalysts, and particularly to those utilized to catalyze the reaction of hydrogen with organic compounds containing nitrogen and/or sulfur so as to yield a denitrogenated and/or desulfurized product. More particularly, the invention is directed to catalysts and a method for preparing catalysts useful for the hydrodenitrogenation and/or hydrodesulfurization of hydrocarbon liquids. The invention is especially directed to catalysts of high hydrodenitrogenation activity.

In the refining of liquid hydrocarbons derived from mineral oils and other sources, it is often desirable to subject the liquid hydrocarbon or fraction thereof to hydrotreating. Hydrotreating is a refining process wherein liquid hydrocarbons are reacted with hydrogen. Hydrotreating is often employed to reduce the hydrocarbon concentration of olefins and oxygen. Hydrotreating is most commonly employed, however, to reduce the hydrocarbon concentration of nitrogen and/or sulfur. Reducing the concentration of nitrogen and sulfur produces a product hydrocarbon which, when eventually combusted, results in reduced air pollutants of the forms $NO_x$ and $SO_x$. Reducing the concentration of nitrogen is also desirable to protect other refining processes, such as hydrocracking, which employ catalysts which deactivate in the presence of nitrogen.

In general, the hydrotreating of a nitrogen and/or sulfur-containing feedstock is carried out by contacting the feedstock with hydrogen at elevated temperatures and pressures and in the presence of a suitable catalyst so as to convert the nitrogen to ammonia and the sulfur to hydrogen sulfide.

A typical hydrotreating catalyst comprises particles containing a Group VIII active metal component and a Group VIB active metal component supported on a refractory oxide such as alumina. Phosphorus components are commonly incorporated into the catalyst to improve its activity by increasing its acidity. One catalyst which has been successfully employed on a commercial basis consists essentially of molybdenum, nickel, and phosphorus components supported on gamma alumina. A typical preparation procedure for such a catalyst is as follows: particles of hydrated alumina are firstly formed into a desired size and shape by extruding the hydrated alumina through a die having circular or polylobal-shaped openings therein and cutting the extruded matter into particles (or extrudates) of 1/16 to ½-inch lengths. The extrudates are calcined at temperatures between about 1,150° and about 1,250° F., whereby the extrudate composition is transformed into gamma alumina. The extrudates are then contacted with an impregnating solution comprising dissolved salts of molybdenum and nickel in aqueous phosphoric acid, and the impregnated extrudates (or composites) are subjected to a second calcination at temperatures typically between about 850° F. and 1,100° F. This second calcination converts the impregnated metals to their oxide forms. The metal oxides are then converted to sulfides, typically by contact at elevated temperatures with a hydrogen-hydrogen sulfide mixture or by contact with hydrogen and a hydrocarbon liquid containing organic sulfur compounds. Because of the problems inherent in the storage and transportation of sulfided catalyst, this final sulfiding step is usually carried out, not by the catalyst manufacturer, but by the catalyst user. Thus, the user normally purchases the catalyst in its oxide form, loads the catalyst into a hydrotreating reactor, and therein converts the catalyst metals to sulfides, either by contacting the catalyst with a specially prepared sulfiding mixture or by simply contacting the catalyst with hydrogen and an organic sulfur-containing feedstock. The resultant composition is a catalyst of high activity for simultaneous hydrodenitrogenation and hydrodesulfurization under conventional hydrotreating conditions.

Despite the high hydrodenitrogenation and hydrodesulfurization activity of the catalysts of the prior art, catalysts of yet higher activities are still being sought. The higher the activity of the catalyst, the lower the hydrotreating reactor temperature required to obtain a product of given nitrogen and sulfur content from a given feedstock. The lower the reactor temperature, the lower the expense of hydrotreating a given unit of feedstock due to the savings in process heat requirements, and the longer the onstream life of the catalyst due to the lower rate of coke formation.

Accordingly, it is a major object of this invention to provide a catalyst with superior hydrodenitrogenation activity and to provide a method for utilizing such a catalyst to achieve superior hydrodenitrogenation results.

It is a further object of this invention to provide a catalyst with superior hydrodesulfurization activity and to provide a method for utilizing such a catalyst to achieve superior hydrodesulfurization results.

It is a further object of this invention to provide a hydrodenitrogenation and hydrodesulfurization catalyst which can be used to denitrogenate or desulfurize a given feedstock for a longer continuous period of time.

It is a still further object of this invention to provide a method for preparing a catalyst with superior hydrodenitrogenation and desulfurization activity.

These and other objects and advantages of this invention will become apparent to those skilled in the relevant art in view of the following description of the invention.

SUMMARY OF THE INVENTION

Briefly, the invention provides a novel hydrotreating catalyst useful for the hydrodenitrogenation and hydrodesulfurization of hydrocarbon feedstocks. The catalyst is comprised of molybdenum, nickel and phosphorous active components on support particles of gamma alumina. The catalyst is prepared by contacting gamma alumina particles with aqueous ammonia, impregnating the resultant particles with molybdenum, nickel and phosphorous, converting the molybdenum and nickel to metal oxides by calcining the impregnated particles at elevated temperatures in the presence of oxygen, and converting the metal oxides to metal sulfides.

The composition and method of this invention provide a gamma alumina supported molybdenum-nickel-phosphorous catalyst with improved hydrodenitrogenation and hydrodesulfurization activities over present-day catalysts of similar composition. The increased activity of this catalyst will allow the hydrotreating of hydrocarbon liquids at lower costs and for longer continuous periods of time.

DETAILED DESCRIPTION OF THE INVENTION

Catalysts of the present invention are prepared with porous refractory oxide particles comprising gamma alumina, preferably in a substantial proportion. Most preferably, the support consists essentially of gamma alumina and is prepared in particulate form, as by the well-known method of extruding a gel of peptized alumina through a die having openings therein of desired size and shape, after which the extruded matter is broken or cut into extrudates of desired length. Preferred refractory oxide particles are shaped like solid right circular cylinders having cross-sectional diameters between about 1/32 and about ⅛ inch and lengths between about 1/16 inch and about ⅜ inch. More preferred are refractory oxide particles having lengths between about 1/32 and about ¾ inch and cross-sections with polylobal shapes, including, but not limited to, those described in U.S. Pat. No. 4,028,227, herein incorporated by reference.

Particulates of an alumina gel prepared by the foregoing methods or their obvious equivalents are then calcined to convert the gel to porous particles of gamma alumina. Temperatures above about 900° F. are usually required to effect the desired conversion, with temperatures between about 1,150° and about 1,300° F. being generally employed. Holding periods between about one half and about three hours are typically utilized to produce preferred particles of gamma alumina for use herein.

The gamma alumina preferred for hydrodenitrogenation and hydrodesulfurization typically has a pore volume between about 0.5 and about 0.9 cubic centimeters per gram and has a pore size distribution such that more than 50 percent of the aggregate pore volume is in pores having diameters between about 50 angstroms and about 200 angstroms. Most preferred is gamma alumina having a pore size distribution such that more than 60 percent of the aggregate pore volume is in pores having diameters between about 60 angstroms and about 80 angstroms.

In accordance with this invention, gamma alumina-containing refractory oxide particles are contacted with an aqueous ammonia solution, resulting in the hydroxylation of the particle surface. The solution preferably contains more than about 0.1 weight percent ammonium hydroxide, and most preferably the solution contains between about 20 and about 30 weight percent ammonium hydroxide. The particles are preferably contacted with a volume of solution which is greater than 8 percent of the aggregate pore volume of the particles. Most preferably, the particles are contacted with a volume of solution sufficient to essentially fill the aggregate pore volume of the particles. After being contacted with the aqueous ammonia solution, the particles are preferably allowed to age in the solution for about 15 to about 250 minutes. Most preferably the particles are allowed to age for a sufficient period of time for the solution hydroxyl ion concentration to reach chemical equilibrium with the gamma alumina surface.

In one embodiment of the invention, the moist, hydroxylated particles are impregnated with molybdenum, nickel and phosphorous in accordance with the impregnation procedure set forth below. It is preferred, however, that before impregnation, the particles be first dried at moderate temperatures, preferably at less than 250° F. If this preferred drying step is employed, then it is further preferred that the particles be remoistened before impregnation. This re-moistening may be accomplished with water, but it is preferably carried out with an aqueous solution of an organic acid having a $pK_a$ less than 5 and preferably greater than 3. $pK_a$ is defined as:

$$pK_a = -\log \frac{[RCOO^-][H^+]}{[RCOOH]}$$

where $[RCOO^-]$ and $[H^+]$ are the solution molar concentrations of the disassociated acid anion and acid cation, respectively, and $[RCOOH]$ is the total solution molar concentration of the organic acid, RCOOH. The symbol R as used herein represents any organic radical composed of carbon and hydrogen or carbon, hydrogen and oxygen. Suitable organic acids include acetic acid, butyric acid, citric acid, lactic acid, malic acid and valeric acid, with citric acid being preferred.

Impregnation with the precursors of the catalytically active components molybdenum, nickel and phosphorous is accomplished by contacting the hydroxylated particles with one or more liquid impregnating solutions containing dissolved molybdenum, nickel and/or phosphorus components. Preferably, a single aqueous impregnating solution is utilized, and in the more preferred embodiment, this solution comprises dissolved ammonium heptamolybdate, nickel nitrate and phosphoric acid. The concentrations of dissolved molybdenum, nickel, and phosphorus components depend, of course, on such factors as the proportions of each component desired in the final catalyst composition and the desired activity thereof. In general, however, the impregnating solution comprises dissolved molybdenum in a concentration of 10 to 50 weight percent as molybdenum trioxide, nickel in a concentration of 1 to 10 weight percent as nickel oxide, and phosphorus in a concentration of 1 to 10 weight percent as elemental phosphorous.

The most highly preferred impregnation method involves contacting the hydroxylated support particles with the impregnating solution under conditions assuring that a predetermined amount of metals and phosphorus is taken up by the support. A usual method, commonly referred to as the pore saturation method, involves determining the pore volume available in the hydroxylated support and then contacting the support particles with an amount of impregnating solution as will just fill the available pore volume with the required amount of metals and phosphorus. A less preferred method differs from the foregoing procedure in that the support particles are immersed in an excess of solution having a predetermined metal and phosphorus content for a sufficient period of time, usually two minutes or less, to just allow the impregnant to enter and completely fill the pore volume of the support, with the amount of liquid so entering containing the desired amount of metals and phosphorus required in the final catalyst.

After the gamma alumina support particles have been impregnated with the desired amount of metals and phosphorus, the resulting impregnated composites are dried and subjected to a final calcination. It is preferred that the drying of the composites be accomplished by heating the composites at low temperatures for a prolonged period of time. Typically the composites are dried at temperatures between about 100° and about 300° F., and preferably between about 100° and about 150° F.

Typically, the final calcination of the composites is accomplished by contacting the composites with flowing air at temperatures between about 800° and about 1,100° F. for a time period sufficient to convert the molybdenum and nickel components to the oxide forms thereof. Preferably this final calcination is performed at temperatures in the range of about 975° to about 1,025° F. The catalyst is then sulfided, as by contact in a reducing atmosphere with hydrogen and hydrogen-sulfide or with a sulfur-containing hydrocarbon feedstock under conditions of elevated temperature and pressure and in the presence of hydrogen, such that the nickel and molybdenum oxide components of the catalyst are converted to sulfides.

The final catalyst usually comprises 12 to 30 weight percent of molybdenum components (calculated as the trioxide), 2 to 6 weight percent of nickel components (calculated as the monoxide), and 2 to 6 weight percent of phosphorus components (calculated as elemental phosphorous). In the most preferred catalyst, the weight ratio of nickel components as nickel oxide to molybdenum components as molybdenum trioxide is between about 0.15:1 and about 0.20:1, and the weight ratio of phosphorus components as elemental phosphorous to nickel components as nickel oxide is between about 0.5:1 and about 1:1.

Catalysts prepared in accordance with this invention may be used to hydrotreat any hydrocarbon feedstock or fraction thereof containing nitrogen and/or sulfur components. Typical hydrocarbon feedstocks suitable for treatment herein are light and heavy gas oils, cycle oils, naphthas, kerosene, turbine fuels, diesel fuels and syncrudes such as shale oils. The preferred feedstocks are gas oils, and in particular gas oils or vacuum gas oils having at least 50 percent of the components thereof boiling at temperatures less than about 700° F., preferably less than about 650° F., and having an end point less than 1,000° F., preferably less than 850° F. The typical gas oil to be treated by contact with the catalyst described herein contains at least 2 ppmw of nitrogen components (calculated as nitrogen), usually between about 10 and about 5,000 ppmw of nitrogen components, and at least 0.02 weight percent of sulfur components (calculated as sulfur), usually between about 1.0 and about 3.0 weight percent. The nitrogen components and the sulfur components are generally present in the feedstock essentially completely in the form of organonitrogen and organosulfur compounds, respectively.

Hydrotreating with the catalyst herein is accomplished under conditions known in the art for denitrogenating and/or desulfurizing hydrocarbon feedstocks in the presence of hydrogen. In the usual instance, the feedstock is passed at an elevated temperature and pressure through a catalytic reactor containing a stationary bed of catalyst. Hydrogen is also passed through the reactor with the feedstock, and the hydrogen which is not consumed in converting the nitrogen components to ammonia and the sulfur components to hydrogen sulfide is separated from the denitrogenated and/or desulfurized product oil and recycled to the inlet of the reactor. The conditions employed vary from feedstock to feedstock, but the range of conditions set forth in the following table will be those typically employed:

TABLE I

| Operating Conditions | Suitable | Preferred | Most Preferred |
|---|---|---|---|
| Temperature, °F. | 400–1,000 | 600–850 | 650–800 |
| Pressure, p.s.i.g. | 100–5,000 | 400–3,000 | 500–2,000 |
| Space Velocity, LHSV | 0.1–15 | 0.5–10 | 1–6 |
| Hydrogen Recycle Rate, cf/bbl[1] | 400–20,000 | 1,000–15,000 | 4,000–10,000 |

[1]Measured at 60° F. and 1 atmosphere.

Although the conditions chosen for any given feedstock will depend in large measure upon the quality of the product desired and the concentrations of sulfur and nitrogen in the feedstock, conditions are usually selected to remove a substantial proportion of both nitrogen and sulfur components, usually at least 50 percent of each and preferably at least 80 percent of the sulfur components and 90 percent of the nitrogen components. Most preferably, conditions are chosen to reduce the nitrogen compounds concentration to less than 10 ppmw (as nitrogen) and the sulfur compounds concentration to less than 200 ppmw (as sulfur).

The following example is provided to illustrate the improved performance obtainable with the catalyst of the invention; it is not intended to limit the scope of the invention which is defined by the claims.

EXAMPLE

Seven different catalysts are prepared, and an eighth catalyst is purchased from a commercial catalyst manufacturer. Each catalyst is comprised of molybdenum, nickel and phosphorus active components supported on gamma alumina particles. Each catalyst is tested for hydrodenitrogenation and hydrodesulfurization activity. A detailed description of the preparation and testing procedures is set forth below, and a summary of the test results is shown in Table V.

PREPARATION OF EXPERIMENTAL CATALYSTS

Catalyst 1

Catalyst 1 is made from 150 grams of a type I gamma alumina support. Type I gamma alumina support consists essentially of particles which are about 0.15 inch long, have a cross-section shaped similarly to a three leaf clover, and have a pore size distribution essentially the same as that set forth in Table II.

150 grams of this type I support is mixed with 20 ml of an aqueous solution containing 0.28 grams of ammonium hydroxide. After allowing the mixture to age in the solution for about 2 hours at ambient conditions, the support particles are pore saturated with 89 ml of an aqueous solution containing 42.4 grams of ammonium heptamolybdate, 22.9 grams of nickel nitrate hexahydrate and 11.8 ml of 85 weight percent phosphoric acid. The resulting composite is dried at about 230° F. and then calcined at about 900° F. in flowing air. After calcination, the composite is sulfided by contact with a gaseous mixture containing about 90 volume percent hydrogen and about 10 volume percent hydrogen sulfide at temperatures which are gradually raised from room temperature to about 700° F. and then held at about 700° F. for about 2 hours.

The resulting catalyst is comprised of 18 weight percent molybdenum, calculated as molybdenum trioxide, 3 weight percent nickel, calculated as nickel oxide and 3 weight percent phosphorous, calculated as elemental phosphorous.

Catalyst 2

Catalyst 2 is a commercially available hydrotreating catalyst purchased from its manufacturer in its oxide state. Catalyst 2 is comprised of type I gamma alumina support particles impregnated with 18 weight percent molybdenum, calculated as molybdenum trioxide, 3 weight percent nickel, calculated as nickel oxide and 3 weight percent phosphorous, calculated as elemental phosphorous. After purchase, Catalyst 2 is sulfided by the same procedure employed in preparing Catalyst 1.

Catalyst 3

Catalyst 3 is made from 125 grams of a type II gamma alumina support. Type II gamma alumina support consists essentially of particles which are about 0.15 inch long, have a quadralobal cross-sectional shape, and have a pore size distribution essentially the same as that set forth in Table II.

125 grams of this type II support is immersed in an excess of an aqueous solution containing 13.26 weight percent ammonium hydroxide. The excess liquid is filtered off and the moist support particles are dried at about 230° F. The dried particles are then contacted with 4 grams of citric acid monohydrate in 20 ml of water. Almost immediately thereafter the particles are pore saturated with 100 ml of an aqueous impregnating solution containing 54 grams of ammonium heptamolybdate, 32 grams of nickel nitrate hexahydrate and 14.6 ml of an 85 weight percent phosphoric acid solution. The particles are then aged for about one hour, dried at about 230° F. for about 18 hours and calcined in flowing air at about 1,000° F. After calcination, the composite is sulfided by the same procedure employed in preparing Catalyst 1.

The resulting catalyst particles are comprised of 24 weight percent molybdenum, calculated as molybdenum trioxide, 4.5 weight percent nickel, calculated as nickel oxide, and 3.6 weight percent phosphorous, calculated as elemental phosphorous.

Catalyst 3A

Catalyst 3A is prepared in the same way as Catalyst 3 except that instead of being dried at about 230° F. for about 18 hours, Catalyst 3A is dried at about 122° F. for about 15 hours.

Like Catalyst 3, Catalyst 3A is comprised of 24 weight percent molybdenum, calculated as molybdenum trioxide, 4.5 weight percent nickel, calculated as nickel oxide, and 3.6 weight percent phosphorous, calculated as elemental phosphorous.

Catalyst 4

This catalyst is prepared in the same way as Catalyst 3 except that there is no contacting of the gamma alumina particles with aqueous ammonia.

Like Catalysts 3 and 3A, Catalyst 4 is comprised of 24 weight percent molybdenum, calculated as molybdenum trioxide, 4.5 weight percent nickel, calculated as nickel oxide, and 3.6 weight percent phosphorous, calculated as elemental phosphorous.

Catalyst 5

Catalyst 5 is prepared with a type III gamma alumina support. Type III support consists essentially of particles which are about 0.15 inch long, have a cross-section shaped like a right circular cylinder, and have a pore size distribution essentially the same as that set forth in Table II.

375 grams of this type III support is immersed in an excess of an aqueous solution containing 13.26 weight percent ammonium hydroxide. The excess liquid is filtered off, and the moist support extrudate particles are dried at about 230° F. The dried particles are then moistened with 45 ml of water and pore saturated with 260 ml of an aqueous solution containing 134 grams of ammonium heptamolybdate, 78 grams of nickel nitrate hexahydrate and 35 ml of 85 weight percent phosphoric acid. The particles are then aged for about 2 hours, dried at about 230° F., and calcined in flowing air at about 1,000° F. After calcination, the composite is sulfided by the same procedure employed in preparing Catalyst 1.

The resulting catalyst particles are comprised of 21 weight percent molybdenum, calculated as molybdenum trioxide, 3.8 weight percent nickel, calculated as nickel oxide, and 3.1 weight percent phosphorous, calculated as elemental phosphorous.

Catalyst 5A

Catalyst 5A is prepared similarly to Catalyst 5 except that only one third as much catalyst is prepared and the precalcination drying step is slightly different. 125 grams of type III gamma alumina particles are immersed in an excess of an aqueous solution containing 13.26 weight percent ammonium hydroxide. The excess liquid is filtered off, and the moist support particles are dried at about 230° F. The dried particles are moistened with 15 ml of water and then pore saturated with 90 ml of an aqueous solution containing 45 grams of ammonium heptamolybdate, 26 grams of nickel nitrate hexahydrate and 12 ml of 85 weight percent phosphoric acid. The particles are then aged for about 2 hours and dried, first at about 122° F. for about 4 hours and then at about 212° F. for about 15 hours. The dried particles are then calcined at about 1,000° F. and sulfided by the same procedure employed in sulfiding Catalyst 1.

Like Catalyst 5, Catalyst 5A is comprised of 21 weight percent molybdenum, calculated as molybdenum trioxide, 3.8 weight percent nickel, calculated as nickel oxide, and 3.1 weight percent phosphorous, calculated as elemental phosphorous.

Catalyst 6

This catalyst is prepared in the same way as Catalyst 5 except that there is no contacting of the gamma alumina particles with aqueous ammonia. Like Catalysts 5 and 5A, Catalyst 6 is comprised of 21 weight percent molybdenum, calculated as molybdenum trioxide, 3.8 weight percent nickel, calculated as nickel oxide, and 3.1 weight percent phosphorous, calculated as elemental phosphorous.

TABLE II

| | SUPPORT PORE SIZE DISTRIBUTION | | | | | |
|---|---|---|---|---|---|---|
| | Type I | | Type II | | Type III | |
| Pore Diameter, A° | Pore Volume, cc/gram | % of total p.v. | Pore Volume, cc/gram | % of total p.v. | Pore Volume, cc/gram | % of total p.v. |
| 0–50 | .000 | 0 | .000 | 0 | .000 | 0 |
| 50–60 | .030 | 5 | .020 | 3 | .006 | 1 |
| 60–70 | .100 | 16 | .120 | 19 | .027 | 4 |
| 70–80 | .170 | 27 | .410 | 64 | .080 | 12 |
| 80–90 | .160 | 25 | .050 | 8 | .120 | 18 |
| 90–100 | .060 | 10 | .006 | 1 | .140 | 21 |

TABLE II-continued

| SUPPORT PORE SIZE DISTRIBUTION | | | | | | |
|---|---|---|---|---|---|---|
| | Type I | | Type II | | Type III | |
| Pore Diameter, A° | Pore Volume, cc/gram | % of total p.v. | Pore Volume, cc/gram | % of total p.v. | Pore Volume, cc/gram | % of total p.v. |
| >100 | .110 | 17 | .034 | 5 | .300 | 44 |
| Total | .630 | 100 | .640 | 100 | 0.673 | 100 |

EVALUATION OF RELATIVE CATALYST ACTIVITY

One at a time, each catalyst is utilized in a benchscale reactor to hydrotreat a portion of a single lot of gas oil feedstock under essentially identical conditions. The properties of the gas oil feedstock is set forth in Table III, and the reactor conditions are set forth in Table IV.

TABLE III

| FEEDSTOCK CHARACTERISTICS | |
|---|---|
| Volumetric Cut | Boiling Range[1], °F. |
| IBP/5 | 362/481 |
| 10/20 | 498/529 |
| 30/40 | 556/585 |
| 50/60 | 618/642 |
| 70/80 | 675/711 |
| 90/95 | 750/781 |
| EP/Rec., Vol. % | 801/98.0 |
| Gravity, D287, °API | 24.6 |
| Sulfur, wt. % | 1.30 |
| Nitrogen: | |
| Basic, wt. % | 0.0688 |
| Total, wt. % | 0.188 |
| Pour Point, D-97, °F. | +35 |
| Carbon Residue on 10% Botts, D-189, wt. % | 0.18 |

[1]As determined by the method of ASTM D-1160

TABLE IV

| REACTOR CONDITIONS | |
|---|---|
| Reactor temperature, °F. | 700° F. |
| Reactor pressure, p.s.i.g. | 1,400 |
| Space velocity, LHSV | 2.0 |
| Hydrogen Recycle Rate, cf/bbl[2] | 6,000 |

[2]Measured at 60° F. and 1 atmosphere

During each of the eight catalyst reactor test runs the resulting product stream is analyzed for nitrogen and sulfur content.

Five hydrodenitrogenation and hydrodesulfurization activity comparisons are made between the following comparison pairs of catalysts: Catalyst 1 vs. Catalyst 2, Catalysts 3 and 3A vs. Catalyst 4, and Catalysts 5 and 5A vs. Catalyst 6. Each of the five comparisons is made by first designating one of the comparison pairs as a reference and arbitrarily assigning to that reference a hydrodenitrogenation and a hydrodesulfurization activity value of 100. Then comparative hydrodenitrogenation and hydrodesulfurization activity values relative to the reference catalyst are calculated for the non-reference catalyst using the following standard formulas which assume first order kinetics for hydrodenitrogenation and one and one half order kinetics for hydrodesulfurization:

$$\text{Hydrodenitrogenation activity relative to reference} = \frac{\ln(N_f/N_p)}{\ln(N_f/N_{pr})} \times 100$$

where $N_f$ is the nitrogen concentration of the feedstock, and $N_{pr}$ and $N_p$ are the nitrogen concentrations of the reference catalyst and non-reference catalyst product streams, respectively.

$$\text{Hydrodesulfurization activity relative to reference} = \frac{(1/S_p)^{\frac{1}{2}} - (1/S_f)^{\frac{1}{2}}}{(1/S_{pr})^{\frac{1}{2}} - (1/S_f)^{\frac{1}{2}}} \times 100$$

where $S_f$ is the sulfur concentration of the feedstock, and $S_{pr}$ and $S_p$ and the sulfur concentrations of the reference catalyst and non-reference catalyst product streams, respectively.

RESULTS OF RELATIVE ACTIVITY EVALUATIONS

Catalyst 1 vs. Catalyst 2

Using Catalyst 2 as the reference having assigned activities of 100, Catalyst 1 has a relative hydrodenitrogenation activity of 121 and a relative hydrodesulfurization activity of 125. This shows that catalysts prepared by the method of this invention are markedly superior to present-day commercial catalysts of similar composition.

Catalyst 3 and 3A vs. Catalyst 4

Using Catalyst 4 as the reference catalyst having assigned activity values of 100, Catalyst 3 has a relative hydrodenitrogenation activity of 115 and a relative hydrodesulfurization activity of 137. This shows that catalysts prepared by the method of this invention are markedly superior to catalysts prepared in the same way but without hydroxylating the gamma alumina support.

Using Catalyst 4 again as the reference having assigned activity values of 100, Catalyst 3A has a relative hydrodenitrogenation activity of 130 and a relative hydrodesulfurization activity of 156. This shows that catalysts prepared by the preferred, low temperature drying method can be even more superior to the non-hydroxylated support reference catalyst.

Catalyst 5 and 5A vs. Catalyst 6

Using Catalyst 6 as the reference having assigned activity values of 100, Catalyst 5 has a relative hydrodenitrogenation activity of 113 and a relative hydrodesulfurization activity of 110. This further shows that catalysts prepared by the method of this invention are superior to catalysts prepared in the same way but without hydroxylating the gamma alumina support.

Using Catalyst 6 again as the reference having assigned activity values of 100, Catalyst 5A has a relative hydrodenitrogenation activity of 109 and a relative hydrodesulfurization activity of 105. This still further shows that catalysts prepared by the method of this invention are superior to catalysts prepared in a similar manner but without hydroxylating the gamma alumina support.

The results of the foregoing relative activity evaluations further show that the superiority of the catalyst preparation method of this invention is not restricted to any particular form of gamma alumina. The evaluations are made using catalysts prepared with three different types of gamma alumina support manufactured by two different companies. The results uniformly show the superiority of catalysts prepared by the method of this invention.

The methods and experimental results of the foregoing comparative example are summarized in Table V.

ducing an aqueous solution containing molybdenum, nickel and phosphorous components into the pores of said hydroxylated support particles so as to provide composites containing, when dry, between about 12 and about 30 weight percent molybdenum components, calculated as molybdenum trioxide, between about 2 and about 6 weight percent nickel components, calcu-

TABLE V
EXAMPLE SUMMARY

| Cat. No. | Support | Prewetting and Impregnating Technique | Drying and Calcination Technique | Composition, wt % % Mo | % Ni | % P | Activities Hydro-denitrogenation | Hydro-desulfurization |
|---|---|---|---|---|---|---|---|---|
| 1 | Type I | $NH_4OH$ contact. Pore saturation with ammonium heptamolybdate, $Ni(NO_3)_2 \cdot 6H_2O$ and diluted $H_3PO_4$. | Dry at 230° F. Calcine at 900° F. in flowing air. | 18 | 3 | 3 | 121 | 125 |
| 2 | Type I | (Commercial catalyst. Preparation procedure unknown) | (Unknown) | 18 | 3 | 3 | 100 | 100 |
| 3 | Type II | $NH_4OH$ contact. Dry. Citric acid monohydrate prewet. Pore saturation with ammonium heptamolybdate, $Ni(NO_3)_2 \cdot 6H_2O$ and diluted $H_3PO_4$. | Dry at 230° F. Calcine at 1,000° F. in flowing air. | 24 | 4.5 | 3.6 | 115 | 137 |
| 3A | Type II | (Same as for Catalyst 3) | Dry at 122° F. Calcine at 1,000° F. in flowing air. | 24 | 4.5 | 3.6 | 130 | 156 |
| 4 | Type II | Citric acid monohydrate contact. Pore saturation with ammonium heptamolybdate, $Ni(NO_3)_2 \cdot 6H_2O$ and diluted $H_3PO_4$. | (Same as for Catalyst 3) | 24 | 4.5 | 3.6 | 100 | 100 |
| 5 | Type III | $NH_4OH$ contact. Dry. Water content. Pore saturation with ammonium heptamolybdate, $Ni(NO_3)_2 \cdot 6H_2O$ and diluted $H_3PO_4$. | (Same as for Catalyst 3) | 21 | 3.8 | 3.1 | 113 | 110 |
| 5A | Type III | (Same as for Catalyst 5) | Dry at 122° F. then at 212° F. Calcine at 1,000° F. in flowing air. | 21 | 3.8 | 3.1 | 109 | 105 |
| 6 | Type III | Water contact. Pore saturation with ammonium heptamolybdate, $Ni(NO_3)_2 \cdot 6H_2O$ and diluted $H_3PO_4$. | (Same as for Catalyst 3) | 21 | 3.8 | 3.1 | 100 | 100 |

Although the invention has been described in conjunction with a comparative example and a preferred embodiment thereof, it is evident that many alterations, modifications, and variations of the invention will appear to those skilled in the art in light of the foregoing description. Accordingly, it is intended in the invention to embrace all such alternatives, modifications, and variations as fall within the spirit and scope of the appended claims.

We claim:

1. A catalyst composition useful for denitrogenation and desulfurization of hydrocarbon feedstocks by reaction with hydrogen, said catalyst composition comprising molybdenum, nickel and phosphorous active components on support particles comprising gamma alumina, said catalyst having been prepared by a method comprising the steps of:
   (a) contacting said support particles with an aqueous ammonia solution;
   (b) subsequently impregnating the resultant support particles with molybdenum, nickel and phosphorous by contacting said support particles with an acidic impregnating solution; and
   (c) calcining impregnated particles from step (b) at an elevated temperature in the presence of oxygen.

2. The composition defined in claim 1 comprising the additional step of sulfiding calcined particles obtained from step (c) to convert essentially all of the molybdenum and nickel components to metal sulfides.

3. The composition defined in claims 1 or 2 wherein support particles obtained from step (a) are impregnated with molybdenum, nickel and phosphorous by introducing an aqueous solution containing molybdenum, nickel and phosphorous components into the pores of said hydroxylated support particles so as to provide composites containing, when dry, between about 12 and about 30 weight percent molybdenum components, calculated as molybdenum trioxide, between about 2 and about 6 weight percent nickel components, calculated as nickel oxide, and between about 2 and about 6 weight percent phosphorous components, calculated as elemental phosphorous.

4. The composition defined in claim 1 wherein said gamma alumina support particles are contacted with a volume of aqueous ammonia solution which is greater than 8 percent of the aggregate pore volume of said particles.

5. A catalyst composition useful for the denitrogenation and desulfurization of hydrocarbon feedstocks by reaction with hydrogen, said catalyst composition comprised substantially of molybdenum, nickel and phosphorous active components on support particles comprising gamma alumina, said catalyst having been prepared by a method comprising the steps of:
   (a) contacting said support particles with a volume of aqueous ammonia which is greater than 8 percent of the aggregate pore volume of said particles;
   (b) drying the resultant particles;
   (c) contacting dried particles obtained from step (b) with an aqueous solution containing an organic acid having a $pK_a$ less than 5;
   (d) introducing an acidic aqueous solution containing molybdenum, nickel and phosphorous components into the pores of particles obtained from step (c) so as to provide composites containing, when dry, between about 12 and about 30 weight percent molybdenum components, calculated as molybdenum trioxide, between about 2 and about 6 weight percent nickel components, calculated as nickel oxide, and between about 2 and about 6 weight percent phosphorous components, calculated as elemental phosphorous;

(e) drying composites obtained from step (d);

(f) calcining dried composites obtained from step (e) at temperatures between about 850° F. and about 1,100° F. in the presence of oxygen so as to essentially convert said molybdenum and nickel components to metal oxides; and (g) sulfiding composites obtained from step (f) to convert essentially all of said metal oxides to metal sulfides.

6. The composition defined in claim 5 wherein said support particles are contacted with a volume of aqueous ammonia solution sufficient to essentially fill the aggregate pore volume of said particles.

7. The composition defined in claim 5 wherein said aqueous ammonia solution contains greater than about 0.1 weight percent ammonium hydroxide.

8. The composition defined in claim 5 wherein said aqueous ammonia solution contains between about 20 and about 30 weight percent ammonium hydroxide.

9. The composition defined in claim 5 wherein dried particles obtained from step (b) are contacted with an aqueous solution containing an organic acid having a $pK_a$ less than 5 but greater than 3.

10. The composition defined in claim 5 wherein dried particles obtained from step (b) are contacted with an aqueous solution containing citric acid.

11. The composition defined in claim 5 wherein dried particles obtained from step (b) are contacted with water.

12. The composition defined in claim 5 wherein said composites obtained from step (d) are dried at temperatures less than about 150° F.

13. The composition defined in claim 5 wherein said aqueous solution containing molybdenum, nickel and phosphorous components is introduced into the pores of particles obtained from step (c) such that the ratio of said nickel components, calculated as nickel oxide, to said molybdenum components, calculated as molybdenum trioxide, is between about 0.15:1 and about 0.20:1, such that the ratio of said phosphorous components, calculated as elemental phosphorous, to said nickel components, calculated at nickel oxide, is between about 0.5:1 and 1:1.

14. The composition defined in claim 5 wherein said dried composites obtained from step (e) are calcined at temperatures between about 975° and about 1,025° F.

15. A catalyst composition useful for the denitrogenation and desulfurization of hydrocarbon feedstocks by reaction with hydrogen, said catalyst composition consisting essentially of molybdenum, nickel and phosphorous active components on support particles consisting essentially of gamma alumina, said catalyst having been prepared by a method comprising the steps of:

(a) contacting selected gamma alumina support particles with a volume of an aqueous ammonia solution containing between about 20 and about 30 weight percent ammonium hydroxide, said volume being sufficient to essentially fill the aggregate pore volume of said particles, and said support particles being selected such that more than 60 percent of the aggregate particle pore volume is in pores having diameters between about 60 and about 80 angstroms;

(b) drying the resultant support particles;

(c) contacting dried particles obtained from step (b) with an aqueous solution of citric acid;

(d) introducing an acidic aqueous solution containing ammonium heptamolybdate, nickel nitrate, and phosphoric acid into the pores of particles obtained from step (c) so as to provide composites containing, when dry, between about 12 and about 30 weight percent molybdenum components, calculated as molybdenum trioxide, between about 2 and about 6 weight percent nickel components, calculated as nickel oxide, and between about 2 and about 6 weight percent phosphorous components, calculated as elemental phosphorous, such that the ratio of said nickel components, calculated as nickel oxide, to said molybdenum components, calculated as molybdenum trioxide, is between about 0.15:1 and about 0.20:1, and such that the ratio of said phosphorous componets, calculated as elemental phosphorous, to said nickel components, calculated as nickel oxide, is between about 0.5:1 and 1:1;

(e) drying composites obtained from step (d) at temperatures less than about 150° F.;

(f) calcining dried composites obtained from step (e) at temperatures between about 975° F. and about 1,025° F. in the presence of oxygen such that said molybdenum and nickel components are essentially converted to metal oxides; and (g) sulfiding said dried composites obtained from step (f) by contacting said composites with hydrogen sulfide and/or organic sulfur compounds in a hydrogen atmosphere such that said metal oxides are essentially converted to metal sulfides.

16. The composition defined in claim 15 wherein support particles obtained from step (a) are aged for more than 15 minutes before being dried in step (b).

17. The composition defined in claim 15 wherein support particles obtained from step (a) are aged for a period of time sufficient to allow hydroxyl ions within said aqueous ammonia solution to substantially reach chemical equilibrium with the surface of said gamma alumina support particles before said support particles are dried in step (b).

18. A method for preparing a catalyst composition useful for denitrogenation and desulfurization of hydrocarbon feedstocks by reaction with hydrogen, said catalyst composition comprising molybdenum, nickel and phosphorous active components on support particles comprising gamma alumina, said method comprising the steps of:

(a) contacting said support particles with an aqueous ammonia solution;

(b) subsequently impregnating the resultant support particles with molybdenum, nickel and phosphorous by contacting said support particles with an acidic impregnating solution; and (c) calcining impregnated particles from step (b) at an elevated temperature in the presence of oxygen.

19. The method defined in claim 18 comprising the additional step of sulfiding calcined particles obtained from step (c) such that essentially all molybdenum and nickel components are converted to metal sulfides.

20. A catalyst composition useful for the denitrogenation and desulfurization of hydrocarbon feedstocks by reaction with hydrogen, said catalyst composition consisting essentially of molybdenum, nickel and phosphorous active components on support particles consisting essentially of gamma alumina, said catalyst having been prepared by a method comprising the steps of:
  (a) contacting gamma alumina support particles with an aqueous ammonia solution, said support particles having more than 60 percent of their aggregate particle pore volume in pores having diameters between about 60 and about 80 angstroms;
  (b) subsequently impregnating the resultant support particles with molybdenum, nickel and phosphorous; and
  (c) calcining impregnated particles from step (b) at an elevated temperature in the presence of oxygen.

21. The composition defined in claim 20 wherein aqueous ammonia contacted support particles from step (a) are dried before being impregnated in step (b).

22. The composition defined in claim 21 wherein support particles obtained from the drying of aqueous ammonia contacted support particles from step (a) are contacted before being impregnated in step (b) with an aqueous solution containing an organic acid having a pKa less than 5 but greater than 3.

23. The composition defined in claim 22 wherein said aqueous solution containing an organic acid having a pKa less than 5 but greater than 3 is an aqueous solution containing citric acid.

24. A catalyst composition useful for the denitrogenation and desulfurization of hydrocarbon feedstocks by reaction with hydrogen, said catalyst composition consisting essentially of molybdenum, nickel and phosphorous active components on support particles consisting essentially of gamma alumina, said catalyst having been prepared by a method comprising the steps of:
  (a) contacting gamma alumina support particles with an aqueous ammonia solution, said support particles having more than 60 percent of their aggregate particle pore volume in pores having diameters between about 60 and about 80 angstroms;
  (b) subsequently impregnating the resultant support particles with molybdenum, nickel and phosphorous by contacting said support particles with an acidic impregnating solution; and
  (c) calcining impregnated particles from step (b) at an elevated temperature in the presence of oxygen.

* * * * *

UNITED STATES PATENT AND TRADEMARK OFFICE
CERTIFICATE OF CORRECTION

PATENT NO. : 4,446,248

DATED : May 1, 1984

INVENTOR(S) : HOWARD D. SIMPSON: RYDEN L. RICHARDSON

It is certified that error appears in the above-identified patent and that said Letters Patent are hereby corrected as shown below:

Delete claim 12.

Claim 13, column 13, line 43, before "such" insert --and--.

Claim 15, column 14, line 18 change "componets" to --components--.

Claim 15, column 14, lines 22 and 23, delete "at temperatures less than about 150° F."

Signed and Sealed this

Eleventh Day of December 1984

[SEAL]

Attest:

GERALD J. MOSSINGHOFF

Attesting Officer   Commissioner of Patents and Trademarks